Patented Apr. 4, 1939

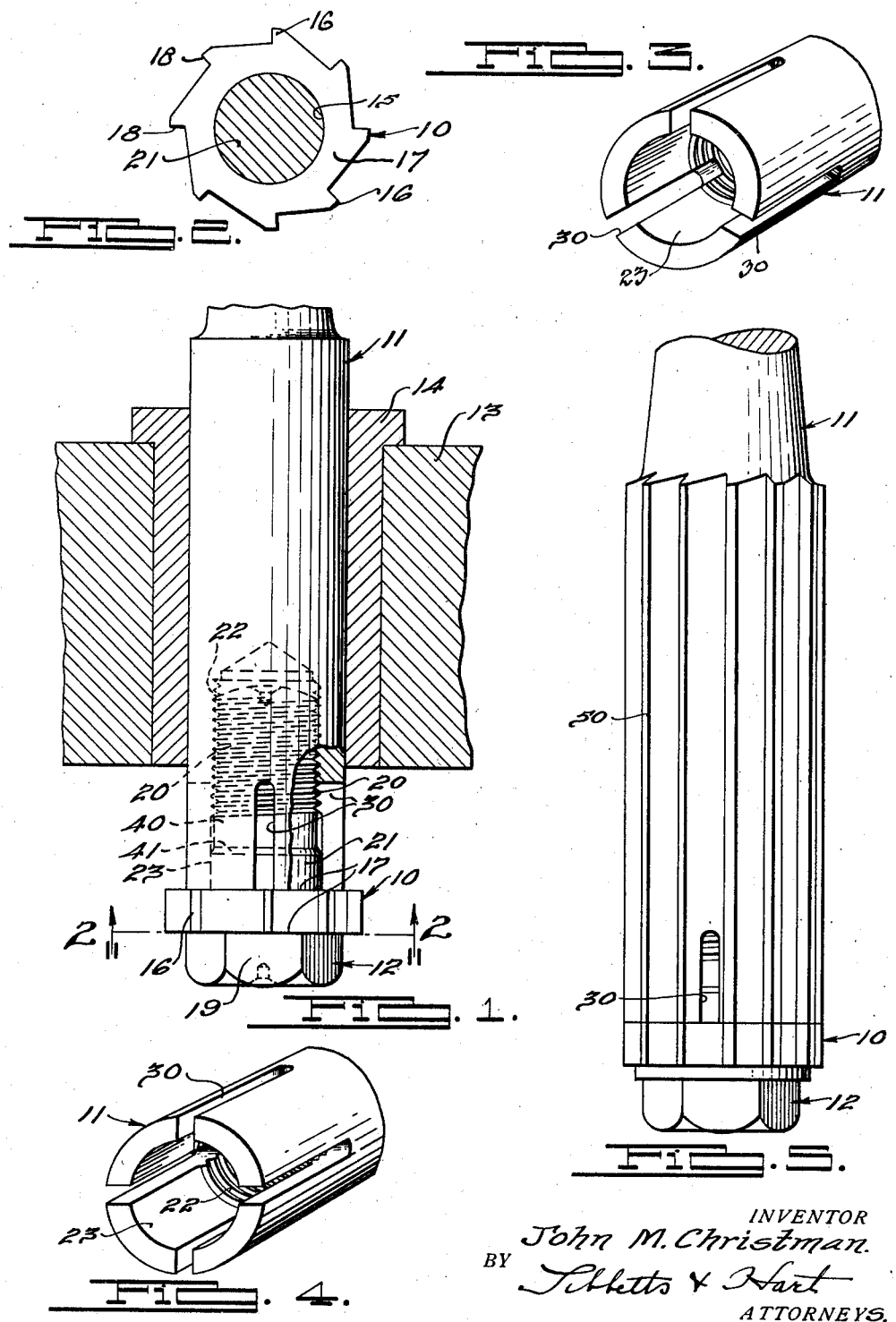

2,153,236

UNITED STATES PATENT OFFICE 2,153,236

TOOL

John M. Christman, Detroit, Mich., assignor to Packard Motor Car Company, Detroit, Mich., a corporation of Michigan Application April 19, 1937, Serial No. 137,675

8 Claims. (Cl. 29—103)

This invention relates to tools and more particularly to rotary tools.

Rotary cutting tools for forming inner or outer surfaces on work pieces usually comprise a driven supporting member and cutter means. The cutter means have been formed as an integral part of the supporting member, as separate teeth applied to the supporting member, and as a separate unit cutter secured to the supporting member. It is to the last mentioned type of tool that this improvement relates, and in order to obtain accurate results for most usages the unit must be fixed to the supporting member so that there can be no movement of one relative to the other.

One means for securing a cutter to a supporting member to obtain accurate work is set forth in my Patent No. 2,087,231, issued July 30, 1937. Such securing means comprises a bolt that pilots the cutter and is screwed into the supporting member until the head clamps the cutter against the end of the supporting member. In order to prevent movement of the bolt in a direction normal to the axis, the pilot portion of the shank is arranged to tightly engage in the supporting member adjacent the end to which the cutter is clamped. This relation of the pilot portion of the bolt with the supporting member requires careful workmanship to maintain similar diameters, or else considerable time is required in mating the parts of a similar diameter. In either event, the manufacturing cost is greater than is desired.

An object of this invention is to reduce the cost of rotary tools of the type referred to by providing parts that can be readily assembled in tight fitting relation after allowing substantial manufacturing tolerances.

Another object of the invention is to provide a rotary cutting tool, of the type referred to, in which the piloting bolt is formed oversize and the portion of the bar into which it fits is formed flexible to effect a tight assembled fit, the extent of the oversize of the bolt being immaterial within limits.

Another object of the invention is to provide a rotary tool with means for supporting a cutter that can be manufactured at a relatively low cost without sacrificing operating accuracy.

Other objects of the invention will appear from the following description taken in connection with the drawing, which forms a part of this specification, and in which:

Fig. 1 is a view partly in section of a cutting tool constructed in accordance with my invention;

Fig. 2 is a sectional view taken on line 2—2 of Fig. 1 showing the cutter form;

Fig. 3 is a perspective view of one end of the cutter supporting bar;

Fig. 4 is another perspective view of the end of a tool supporting bar of a slightly modified form;

Fig. 5 is a plan view of a modified form of a tool having the invention incorporated therewith.

Referring to the drawing, the cutter or cutting member of the tool is indicated generally at 10 and it is fixed to a supporting member or bar 11 by a bolt 12. A carrier 13 is provided for the supporting bar 11 and this carrier has a sleeve 14 in which the bar is mounted so that it can be rotated and moved in an axial direction by suitable driving mechanism (not shown).

The cutter is in the form of a disk having a cylindrical opening 15, extending axially therethrough, and teeth 16 extending across the peripheral face thereof. The flat end faces 17 of the cutter are formed parallel and extend normal to the axial feed of the tool so that in operation the edges 18 of the teeth at the leading end of the cutter have a surface contact with the work in removing material therefrom.

The bolt for holding the cutter on the supporting bar has a hex head 19 at one end, a thread 20 at the end of the shank, a smooth cylindrical shank surface 21 adjacent the head that serves as a pilot and a cylindrical shank portion 40 between the pilot portion and the threaded end. This portion 40 of the bolt shank is of smaller diameter than the threaded portion and the threaded portion is of slightly less diameter than the pilot portion. If desired the cylindrical portions of the bolt shank can be joined by a beveled portion 41. The leading end of the supporting bar 11 has an axially extending bore formed therein, the boundary surface being threaded at its inner end 22 and of smooth cylindrical form at its outer end 23. The leading end face of the supporting bar 11 is formed normal to the axial feed of the tool and the following face of the cutter is clamped thereagainst by the head of the bolt 12 which engages the leading face of the cutter. The bolt is projected through the axial opening in the cutter and is screwed into the threaded portion of the bore of the supporting bar until the cutter is held tightly against the end of the supporting bar by the bolt head.

With this construction it will be seen that not only is the cutter 10 piloted centrally upon and adapted to be secured to the supporting bar, but if the bolt 12 is not originally tightened to the required degree, the first cutting operation of the tool will cause the bolt to screw into the supporting bar and automatically tighten the cutter against the end of the supporting bar. With this construction the disk cutter is equally clamped at all points, it is more easily applied to the support than would be the case if a key or spline were used, and since no keyway is formed in the cutter and the cylindrical opening 15, the spaces between the teeth are the only cutaway parts of the disk.

In the formation of the tool shown in my previously mentioned application, the pilot portion of the bolt must be formed the same diameter as the adjacent bore portion of the supporting bar and so long as this similar diameter condition is maintained the bolt cannot move normal to the axial feed of the tool. Consequently, the cutter will be maintained in proper axial alignment with the work being operated upon irrespective of the amount of thrust exerted thereagainst. This requirement of exactly corresponding diameters of the pilot portion of the bolt and the adjacent wall portion of the bore in the supporting bar is difficult to maintain in production and requires careful workmanship. If such diameters are not the same, then the parts must be selectively mated and, in either event, the manufacturing expense is relatively high. It is the purpose of this invention to reduce the present cost of such tools by eliminating the requirement for careful workmanship and the matching of parts.

In carrying out this improvement I provide longitudinally extending slots 30 in the bored end of the supporting bar which extend preferably at least the full length of the smooth cylindrical inner wall portion 23. These slots are preferably equally spaced and small in number. In Fig. 3 I have illustrated three slots in the end of the supporting bar and in Fig. 4 I have shown four slots in the end of the supporting bar. The supporting bar is formed preferably of metal and the sections between the slots are sufficiently resilient to be sprung radially by the bolt. I propose to form the shank of the bolt oversize, that is of a larger diameter than the smooth bore portion 23 in the supporting bar, so that when inserted into the bore in the supporting bar it will spring the sections thereof between the slots in a radial direction providing a tight fit and in concentric relation. The resiliency of the supporting bar sections is such that radial expansion thereof by the bolt is opposed and thus there will be a tight fit between the bolt and the bar which together with the engaging threaded portions provide a pilot for the cutter which will not shift in a direction normal to the axial feed even when the cutter is subjected to heavy operating thrust loads. It is also to be observed that this arrangement of the slots is such that any force tending to move the cutter normal to the axial feed must flex at least two of the sections of the supporting bar in a circumferential direction and this resistance is adequate to prevent outward movement of the bolt relative to the bar in a direction normal to the axial feed of the tool.

In the form of the invention shown in Fig. 5 the cutter and the bolt are the same as in the preferred form of the invention and the bore in the supporting bar is also the same. This form of the invention differs from that previously described only in that the periphery of the supporting bar is provided with flutes 50 and is similar to the periphery of the cutter. This fluted periphery serves as a bearing for the tool because it is of substantially the same diameter as the bore finished by the cutter and directly follows the cutter into the newly formed bore. Such a tool is designed for operations where the carrier 13 is not desired or cannot be used. The diameter of this supporting bar is normally slightly smaller than that of the cutter so that after the bolt expands the slotted end its diameter will be the same as that of the cutter.

It will be understood that the radial expansion of the slotted end of the holder is relatively slight but sufficient to eliminate the careful workmanship previously required in forming the diameter of bolt shanks and bores in the supporting bar. A considerable diameter tolerance for the bolt and the diameter of the bore in the supporting bar can thus be allowed. Careful workmanship and matching of the parts for fastening a cutter to a supporting bar is thus eliminated and the tool cost lowered.

Although the invention has been described in connection with a specific embodiment, the principles involved are susceptible of numerous other applications which will readily occur to persons skilled in the art.

What I claim is:

1. A rotary cutting tool comprising a disk cutter having peripheral teeth and a cylindrical opening extending axially therethrough, a supporting bar having a radially expansible end face abutting one end face of the cutter, pilot means centering the cutter on the bar, said pilot means radially expanding the end of said bar to form a tight fit therewith, and means engaging the other end face of the cutter in a relation to hold the cutter in tightly abutting relation against the bar end.

2. A rotary cutting tool comprising a cutter in the form of a disk having peripheral teeth and a cylindrical opening extending in an axial direction thereof, a supporting bar having a hollow resilient end portion, the end face of the resilient end portion of said bar abutting an end face of said disk cutter, pilot means extending through the opening in said disk cutter and anchored in the hollow end portion of said bar, said pilot means being of slightly larger diameter than the normal diameter of the inside of the hollow resilient end portion of said bar, and means associated with said pilot means and the other end face of said disk cutter for securing the cutter tightly against the bar.

3. A rotary cutting tool comprising a cutter in the form of a disk having peripheral teeth and a cylindrical opening extending axially therethrough, a supporting bar having a hollow end portion with longitudinally extending slots therethrough and the end face thereof abutting an end face of said disk cutter, the sections of the bar between said slots being flexible radially a limited extent, pilot means extending through the opening in said cutter and anchored in the hollow end portion of said bar, said pilot means being of greater diameter than the normal interior of the slotted portion of said bar, and means associated with the other face of said cutter and with said pilot means for clamping the cutter in fixed abutting relation with the end of said bar.

4. A rotary cutting tool comprising a cutter in the form of a disk having peripheral teeth and a cylindrical opening extending therethrough, a supporting bar having a radially expansible hollow end portion with its end face in abutting relation with an end face of the cutter, and a bolt extending through the opening in the cutter and anchored in the hollow end of the bar, the head of said bolt engaging the other end face of said cutter and clamping the cutter to the bar, the shank of said bolt centering the cutter and expanding the hollow end portion of the bar in a tight fitting relation therewith.

5. A rotary cutting tool comprising a cutter in the form of a disk having cutting edges on one end extending normal to the disk axis and an axially extending cylindrical opening therethrough, a supporting bar having a hollow cylindrical end portion with longitudinally extending slots therethrough, the portions of said bar between said slots being adapted to be sprung outwardly, and a bolt extending through the cutter opening and anchored in the hollow end of the bar, said bolt centering the cutter and clamping it against the hollow end of the bar, the portion of said bolt in the slotted portion of the bar being greater in diameter than the normal hollow interior thereof.

6. A rotary tool support comprising a metal bar having an axially extending cylindrical bore in one end with a smooth interior surface adjacent the end and a threaded surface inwardly therebeyond, the end portion of the bar being slotted longitudinally the length of the smooth interior surface and the portions between the slots being resilient in a radial direction, a bolt screwed into the bore of the bar, and a cutter piloted on and secured by the bolt, said bolt having a cylindrical smooth surface adjacent the smooth inner surface of the bar and along such length the bolt being larger in diameter than the normal bore diameter in the bar whereby forming a concentric tight fit with the bar.

7. A rotary tool comprising a supporting member having an axially bored end, a portion of said end being slotted longitudinally, a cutter having peripheral teeth and a bore extending axially therethrough, and a bolt passing through the cutter bore and threaded into the bore of the supporting bar for piloting the cutter and securing it to the bar, the sections of said bar between the slots being sprung radially by the bolt in tight fitting relation and rigid in a circumferential direction to effectively resist any force developed in operation of the tool tending to move the bolt relative to the bar in a direction normal to the axis thereof.

8. A rotary tool comprising a supporting member having an axially bored end having a threaded inner portion and a smooth outer portion of slightly greater diameter than the threaded portion, the portion of the bar with the smooth surface having longitudinally extending slots therein forming radially resilient sections therebetween, a cutter having peripheral teeth and a bore extending axially therethrough, and a bolt extending through the cutter bore and screwed into the bore in the bar to pilot the cutter and clamp it against the slotted end of the bar, said bolt having a smooth portion of greater diameter than the smooth bore of the bar, the slots in said bar being spaced so that cutting thrust loads will be transmitted from the bolt to at least two sections of the bar between the slots in a direction circumferentially thereof.

JOHN M. CHRISTMAN.